United States Patent [19]
Bieber

[11] 3,738,707
[45] June 12, 1973

[54] DEVICE FOR DUMPING BEET BOXES
[76] Inventor: George Bieber, Route 2, P.O. Box 116, Fairview, Mont. 59221
[22] Filed: Dec. 29, 1970
[21] Appl. No.: 102,449

[52] U.S. Cl............................... 298/18, 298/23 DF
[51] Int. Cl............................................... B65g 9/00
[58] Field of Search ................... 298/23 D, 23 DF, 298/18, 23 R

[56] References Cited
UNITED STATES PATENTS

| | | | |
|---|---|---|---|
| 1,278,971 | 9/1918 | Mayer | 298/23 DF |
| 2,480,609 | 8/1949 | Rathgeber | 298/23 DF |
| 1,612,223 | 12/1926 | Robinson | 298/23 DF |
| 2,219,256 | 10/1940 | Evangelista | 298/23 DF |
| 2,431,588 | 11/1947 | Sharpe | 298/23 DF X |
| 2,246,128 | 6/1941 | Fairbanks | 298/23 DF |
| 1,935,974 | 11/1933 | Burner | 298/23 D |
| 3,053,574 | 9/1962 | Peterson | 298/23 DF |

FOREIGN PATENTS OR APPLICATIONS

| | | | |
|---|---|---|---|
| 1,083,136 | 6/1960 | Germany | 298/23 R |
| 1,543,210 | 9/1968 | France | 298/23 DF |

*Primary Examiner*—Robert J. Spar
*Attorney*—Berman, Davidson and Berman

[57] ABSTRACT

A dump truck for sugar beets consisting of a vehicle having a longitudinally hinged body with a swingable hinged side gate which can swing open by gravity when the opposite side of the body is raised. Sprocket chains connect the gate to the top ends of upstanding fixed bars on the truck frame adjacent the liftable side of the body, the chains passing around rollers journaled on the hinged body outwardly adjacent the fixed bars and being so arranged as to develop tension in the chains and to swing the side gate to vertical closed position when the hinged body is lowered to its normal position.

3 Claims, 4 Drawing Figures

INVENTOR.
GEORGE BIEBER,

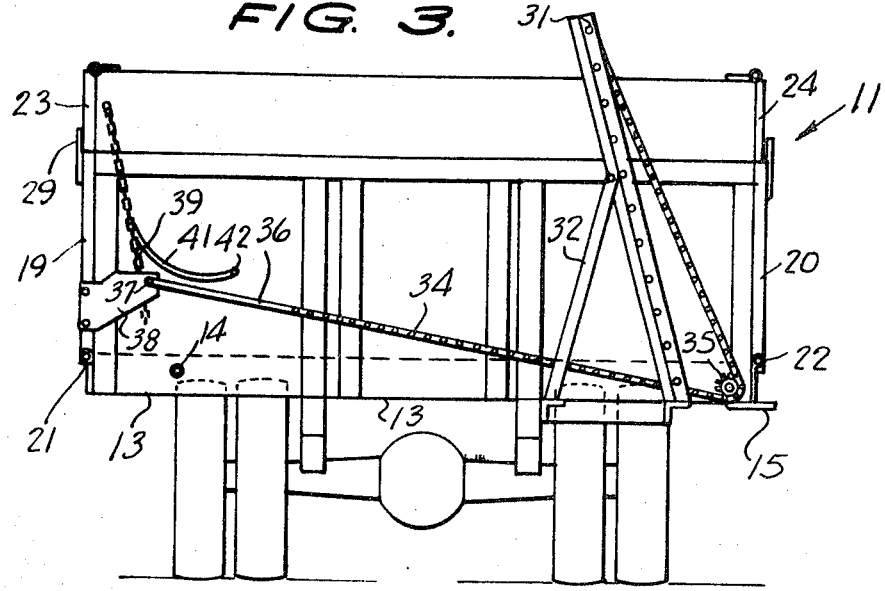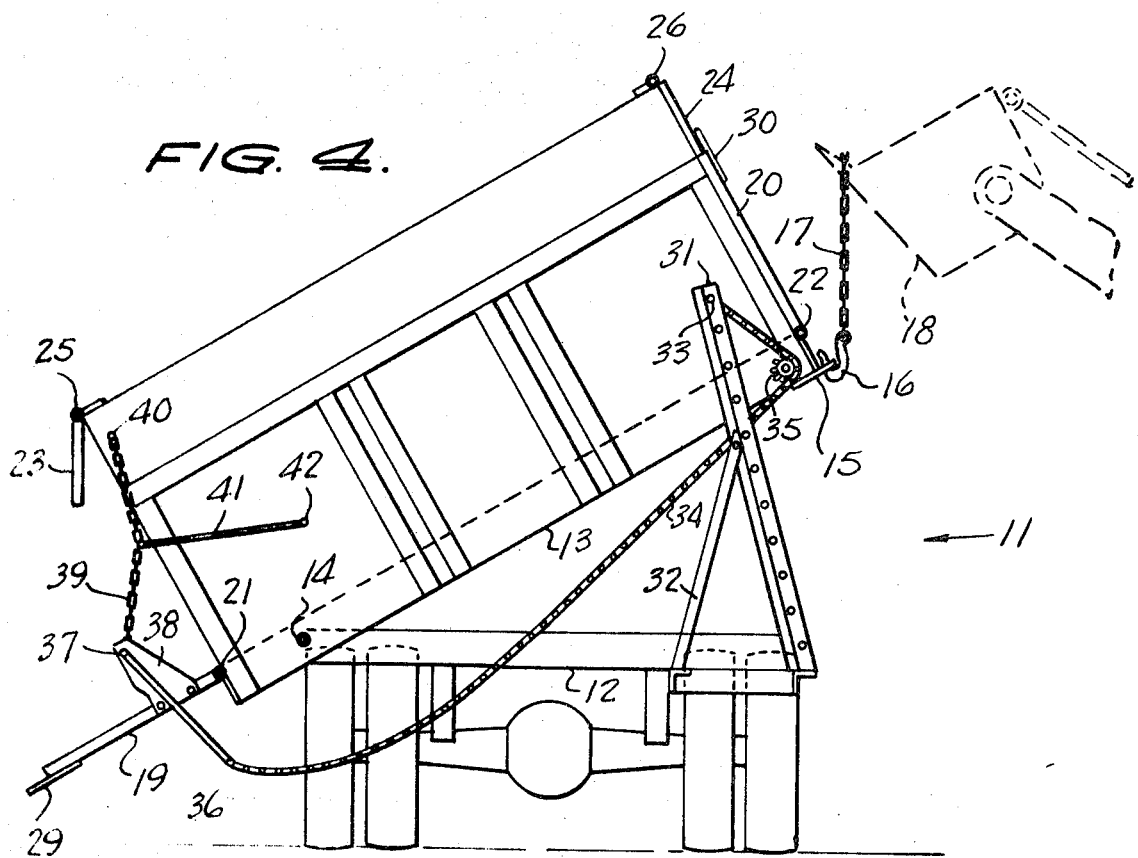

DEVICE FOR DUMPING BEET BOXES

This invention relates to dump vehicles, and more particularly to a dump truck for sugar beets and similar articles.

A main object of the invention is to provide a novel and improved dump vehicle for sugar beets and the like, the vehicle involving relatively simple parts, being operable with a minimum amount of human labor, and enabling sugar beets or similar items to be quickly and efficiently discharged therefrom and allow the truck to be restored to its normal state so that it can be quickly returned for reloading after the dumping operation.

A further object of the invention is to provide an improved side dumping vehicle for sugar beets and similar articles, the vehicle being of the type provided with a swingable side gate for a door which can swing open by gravity when the opposite side of the associated hinged body is raised, the improved dump truck being provided with means for automatically swinging the side gate to closed position when the dump body is lowered to its normal position, the side gate-closing mechanism involving very inexpensive parts, being rugged in construction, and being reliable in operation.

Further objects and advantages of the invention will become apparent from the following description and claims, and from the accompanying drawings, wherein:

FIG. 3 is a rear end elevational view of the dump truck of FIGS. 1 and 2, shown with the tiltable body portion thereof in normal lowered position.

FIG. 4 is a rear end elevational view of the truck of FIGS. 1 and 2 shown with the tiltable hinged body portion thereof in raised dumping position.

Figure 1:
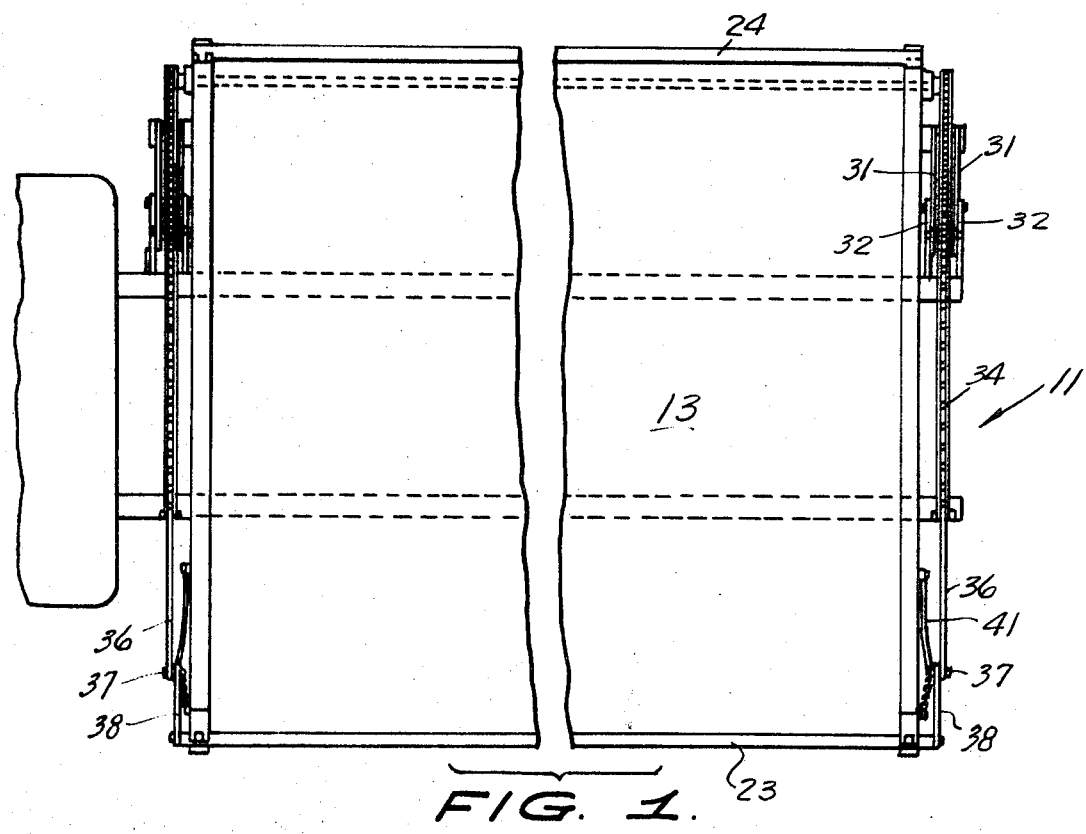
FIG. 1 is a fragmentary top plan view of an improved dump truck for sugar beets constructed in accordance with the present invention.
Figure 2:
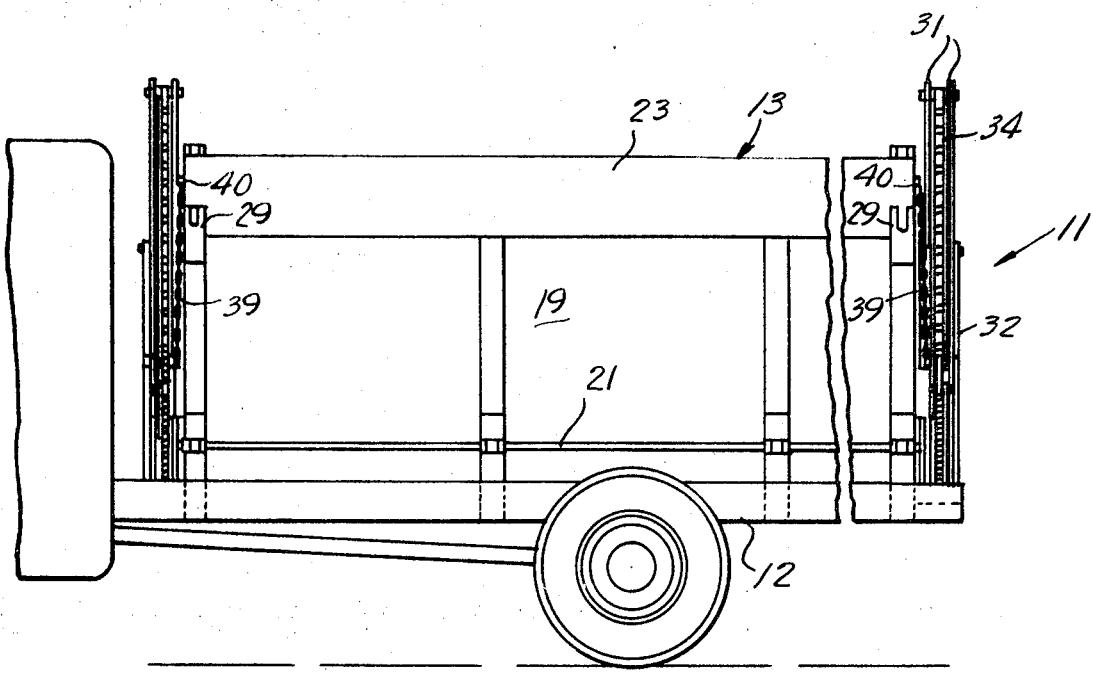
FIG. 2 is a fragmentary side elevational view of the dump truck of FIG. 1.

Referring to the drawings, 11 generally designates an improved dump truck for sugar beets or similar material, constructed in accordance with the present invention. The dump truck 11 comprises a conventional truck chassis 12 on which is hinged a load-carrying body 13 in the form of a rectangular receptacle, the body 13 being hinged to the chassis 12 at the left longitudinal edge of the chassis, as viewed in FIGS. 3 and 4, the hinge assembly including the longitudinally extending hinge rod 14. Thus, the box or receptacle 13 is adapted to swing from its normal horizontal position, shown in FIG. 3, to a tilted dumping position shown in FIG. 4. For this purpose, the right lower corner of the body is provided with an outwardly projecting apertured lug 15 which may be engaged by the hook 16 provided at the end of a chain 17 attached to a lifting hoist member 18 at the location at which the truck is to be dumped. Thus, when the truck arrives at the destination at which it is to be emptied, the hook 16 of the lifting hoist may be engaged with the lug 15 and the lifting hoist may be operated to elevate the tiltable box or receptacle 13 from the position shown in FIG. 3 to the position shown in FIG. 4, causing the contents of the box or receptacle 13 to be discharged to the left side of the dumping truck in a manner presently to be described.

The receptacle or box 13 is provided at its opposite sides with hinged main side gates 19 and 20 which are hinged at the lower side marginal portions of the receptacle 13 on longitudinally extending axes, as shown at 21 and 22. The receptacle 13 is likewise provided with relatively short hinged upper flaps 23 and 24 which are longitudinally hinged at the upper side corners of the receptacle 13, as shown at 25 and 26. The main gates 19 and 20 are provided at their free margins with lugs 29 and 30 which project upwardly to overlie the lower marginal portions of the top flaps 23 and 24 to thereby restrain the top flaps from outward swinging movement when the main side gates 19 and 20 are in their vertical closed positions.

In the assembly of the present invention, the right gate 20 and its corresponding upper flap 24 remain closed and are not employed in dumping, since the receptacle 13 is longitudinally hinged at the side edge of the chassis 12 opposite from the gate member 20 and flap 24. Moreover, it will be understood that the side gate member 20 and its associated flap 24 may be released to provide access to the box or receptacle 13 from the right side thereof, as viewed in FIGS. 3 and 4, for example, for manually unloading the truck body or for loading same.

The tiltable box or receptacle 13 is provided at its front and rear ends with means for automatically controlling the position of the left side gate 19 so that the left side gate 19 is held in its vertical or closed position when the body 13 is in its normal horizontal position, as shown in FIG. 3, and is automatically released to swing open to the position thereof shown in FIG. 4 when the box or receptacle 13 is elevated to dumping position. Thus, adjacent the front and rear walls of the receptacle 13 the chassis is provided with a pair of upstanding spaced parallel inclined bar members 31,31 supported by struts 32, the bar members being inclined upwardly and leftwards, as viewed in FIGS. 3 and 4. Connected between the top end portions of the pairs of bar members, as shown at 33, are respective sprocket chains 34, the sprocket chains extending around sprocket wheels 35 journaled to the lower right corner portions of the side walls of the receptacle 13, as viewed in FIGS. 3 and 4, and extending between the respective pairs of bars 31,31. The opposite ends of the sprocket chains 34 are connected to the ends of respective rods 36,36 which are pivoted at 37 to the top ends of respective rigid bracket plates 38,38 rigidly secured to the front and rear edges of the side gate 19. The pivot bolts 37 are connected by respective control chains 39, 39 to the upper left corner portions of the front and rear end walls of the receptacle 13, as shown at 40. The intermediate portions of the chains 39 are connected by short flexible cables 41 to anchor pins 42 provided in the front and rear end walls of the receptacle 13, the cables 41 cooperating with the chains 39 to limit the outward swinging movement of side gate 19. Thus, the cables 41 may be of proper length so that in cooperation with the chains 39 the outward swinging movement of the side gate 19 is limited to a position substantially flush with the floor of the receptacle 13, as shown in FIG. 4.

The length of the sprocket chains 34 is such that side gate 19 will be held in its closed vertical position when the receptacle or box 13 is in its normal lowered position, shown in FIG. 3. Thus, under these conditions, the chains 34 are taut and the rods 36 are aligned with the lower portions of said chains, as shown in FIG. 3. However, it will be seen from FIG. 3, that as the right side portion of the receptacle 13 is elevated to swing around its hinged axis at 14, the chains 34 become loosened and allow the left side gate 19 to swing outwardly toward the position thereof shown in FIG. 4, namely, until further outward swinging of side gate 19 is prevented by the action of chains 39 and their associated stop cables 41, as above described. After the dumping action has been completed, namely, after the cargo carried by the receptacle 13 has been discharged leftwards down to the ground at the left side of the receptacle 13, as veiwed in FIGS. 3 and 4, the receptacle 13 may be released so as to resume its normal position, shown in FIG. 3. This will cause the sprocket chains 34 to again become taut and to elevate the rods 36 above the level of the axis of the gate hinge at 21, whereby the tension in the sprocket chains will cause the gate 19 to rotate clockwise from the position thereof shown in FIG. 4 to the closed vertical position thereof shown in FIG. 3. The associated longitudinal flap member 23 will swing by gravity towards its vertical position and will be engaged by the lugs 29 of the main gate 19 to hold it closed in the manner above described.

It will thus be seen that gate 19 opens automatically when the right side of the dumping body 13 is lifted, for example, will move from the position thereof shown in FIG. 3 to the position thereof shown in FIG. 4, to allow the contents of the receptacle 13 to discharge by gravity from the left side of the receptacle. When the receptacle 13 is released so as to return to its normal horizontal position, gate 19 will be automatically elevated to its closed position and will be held in said closed position by the tension in the sprocket chains 34. During the tilting action of the receptacle 13 the sprocket chains ride on their associated idler sprocket wheels 35.

It will be apparent that various changes and variations may occur in the structure above described and illustrated in the drawings. It will be noted that in order to elevate the gate 19 to its closed position, it must be swung in a clockwise direction from the position thereof shown in FIG. 4. To insure that a lifting force will be applied to the gate 19, a straight line from the connection 37 tangent to the bottom of the sprocket wheel 35 must be above the level of the hinge axis at 21. Therefore, it will be apparent that the cable 41 serves the important function of insuring that the pivotal connection 37 does not drop too low. Also, it is apparent that the sprocket wheel 35 must be spaced outwardly from the upstanding bars 31, namely, to the right thereof, as viewed in FIGS. 3 and 4.

It has been found that sometimes when the box 13 is tilted to the position shown in FIG. 4, the shifting of weight causes the truck springs on the unloading side to be compressed and the springs on the side opposite the unloading side to be retracted to the point that the frame of the truck is severely tilted by the shifting of the load. This problem is cured by running a chain from the truck bed around the rear axle housing on the side opposite the unloading side. This chain is wrapped around the axle housing and has the effect of keeping the frame on that side of the truck from being raised excessively by the shifting of the load.

While a specific embodiment of the improved dumping vehicle for sugar beets and similar material has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a dumping vehicle, a chassis, a container pivoted to the chassis and having a normal position and a dumping position, said container having a gate portion hinged at its lower edge to the container and swingable to an outward open position, said gate portion having means extending above its hinge axis when the gate portion is in said outward open position, and means connecting said last-named means to the chassis and being formed and arranged to close the gate portion when the container moves from said dumping position toward said normal position, wherein said connection means comprises an upstanding element on the chassis and abutment means on the container spaced from said upstanding element, and flexible tie means secured to said upstanding element and extending around said abutment means, wherein said last-named flexible tie means is secured to the upper portion of said upstanding element and the abutment means is located below the connection of the last named flexible tie means to the upstanding element, wherein the hinged lower edge of the gate portion is at a level below a straight line drawn from the connection of the last-named flexible tie means to said abutment means, wherein said abutment means comprises an idler wheel journalled to the container, wherein said first-named means comprises a connection bracket which projects upwardly when the gate portion is in open position, said last-named flexible tie means being connected to the upper portion of the connection bracket, and additional flexible tie means connected between the upper portion of said connection bracket and a portion of the container spaced upwardly therefrom, wherein said additional flexible tie means comprises a first flexible tie member connecting said bracket to the upper portion of the container and a second flexible tie member connecting the intermediate portion of said first flexible tie member to a point on the container spaced below said upper portion connection of the first flexible tie member.

2. The dumping vehicle of claim 1, and wherein said idler wheel includes a sprocket wheel and said connection means comprises a sprocket chain meshingly engaged around said sprocket wheel.

3. The dumping vehicle of claim 2, and wherein the connection of said connection means to said bracket comprises a rod pivoted to said bracket, said sprocket chain being connected to the rod.

* * * * *